United States Patent
Choi et al.

(10) Patent No.: US 11,805,332 B2
(45) Date of Patent: *Oct. 31, 2023

(54) IMAGE SIGNAL PROCESSOR, ELECTRONIC DEVICE INCLUDING IMAGE SIGNAL PROCESSOR, AND ASSOCIATED METHODS

(71) Applicant: SAMSUNG ELECTRONICS CO., LTD., Suwon-si (KR)

(72) Inventors: Dong-Bum Choi, Suwon-si (KR); Hyunyup Kwak, Suwon-si (KR); Jaeho Lee, Seoul (KR); Ildo Kim, Suwon-si (KR); Seongwook Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/377,816

(22) Filed: Jul. 16, 2021

(65) Prior Publication Data

US 2021/0344855 A1 Nov. 4, 2021

Related U.S. Application Data

(63) Continuation of application No. 16/362,123, filed on Mar. 22, 2019, now Pat. No. 11,082,647.

(30) Foreign Application Priority Data

Aug. 6, 2018 (KR) .................. 10-2018-0091363

(51) Int. Cl.
*H04N 25/60* (2023.01)
*H04N 5/16* (2006.01)
(Continued)

(52) U.S. Cl.
CPC .............. *H04N 25/60* (2023.01); *G06T 1/20* (2013.01); *G06T 1/60* (2013.01); *G06T 5/006* (2013.01);
(Continued)

(58) Field of Classification Search
CPC .......... H04N 25/60; H04N 5/165; H04N 5/20; H04N 5/213; G06T 1/20; G06T 1/60; G06T 5/006; G06T 5/007; G06T 5/00
See application file for complete search history.

(56) References Cited

U.S. PATENT DOCUMENTS 7,417,669 B2   8/2008   Kurane
7,920,181 B2   4/2011   Kokubo et al.
(Continued)

FOREIGN PATENT DOCUMENTS

KR   20110031433 A   3/2011
KR   20180033211 A   4/2018
(Continued)

*Primary Examiner* — Twyler L Haskins
*Assistant Examiner* — Akshay Trehan
(74) *Attorney, Agent, or Firm* — Lee IP Law, P.C.

(57) ABSTRACT

An image signal processor that generates a display signal receives an input image signal having a first pedestal level from an image sensor, generates a first signal from the input image signal, the first signal including a second pedestal level, the second pedestal level being different from the first pedestal level and being determined in accordance with the first pedestal level and a processing gain of the image signal processor, generates a second signal having the second pedestal level by amplifying the first signal in accordance with the processing gain, generates a third signal having the second pedestal level by removing a noise signal from the second signal; and generates a fourth signal by subtracting the second pedestal level from the third signal.

11 Claims, 15 Drawing Sheets

(51) Int. Cl.
     *H04N 5/213*   (2006.01)
     *H04N 5/20*    (2006.01)
     *G06T 1/20*    (2006.01)
     *G06T 1/60*    (2006.01)
     *G06T 5/00*    (2006.01)

(52) U.S. Cl.
     CPC ............ *G06T 5/007* (2013.01); *H04N 5/165* (2013.01); *H04N 5/20* (2013.01); *H04N 5/213* (2013.01); *G06T 5/00* (2013.01)

(56) References Cited

U.S. PATENT DOCUMENTS

| | | | |
|---|---|---|---|
| 8,102,444 | B2 | 1/2012 | Vakrat et al. |
| 8,462,234 | B2 | 6/2013 | Kawamura et al. |
| 9,287,316 | B2* | 3/2016 | Mlinar ............... H01L 27/14685 |
| 9,350,927 | B2 | 5/2016 | Luo |
| 9,369,645 | B2 | 6/2016 | Hsu |
| 9,686,448 | B2* | 6/2017 | Tajbakhsh ............... H04N 5/165 |
| 10,205,898 | B2* | 2/2019 | McMahon ............... H04N 25/63 |
| 10,382,658 | B2 | 8/2019 | Kono |
| 2008/0054320 | A1* | 3/2008 | Solhusvik ............ H04N 25/616 257/292 |
| 2016/0105621 | A1* | 4/2016 | McMahon ............ H04N 25/75 348/243 |
| 2016/0373618 | A1* | 12/2016 | Tajbakhsh ............... H04N 25/63 |
| 2019/0005624 | A1 | 1/2019 | Mao |

FOREIGN PATENT DOCUMENTS

| | | |
|---|---|---|
| WO | WO 2009/147535 A1 | 12/2009 |
| WO | WO 2017082286 A1 | 5/2017 |

* cited by examiner

IMAGE SIGNAL PROCESSOR, ELECTRONIC DEVICE INCLUDING IMAGE SIGNAL PROCESSOR, AND ASSOCIATED METHODS

CROSS-REFERENCE TO RELATED APPLICATIONS

This is a continuation application based on pending application Ser. No. 16/362,123, filed on Mar. 22, 2019, the entire contents of which is hereby incorporated by reference.

Korean Patent Application No. 10-2018-0091363, filed on Aug. 6, 2018, in the Korean Intellectual Property Office, and entitled: "Image Signal Processor and Electronic Device Including Image Signal Processor," is incorporated by reference herein in its entirety.

BACKGROUND

1. Field

Embodiments relate to an image signal processor, and more particularly, relate to an image signal processor which regulates a pedestal dynamically.

2. Description of the Related Art

Electronic devices, e.g., a smartphone, a tablet personal computer (PC), a portable multimedia player (PMP), a laptop PC, a wearable device, etc., may provide an image captured from a camera to a user through a display device. To provide an image, the electronic device may obtain an image signal and may remove a noise signal included in the image signal. The electronic device may provide an improved image to the user by performing signal processing on an image signal.

However, the noise signal may be clipped in the signal processing. When the noise signal is clipped, an artifact may occur at an image displayed through the display device.

SUMMARY

According to an exemplary embodiment, an image signal processor to generate a display signal, the image signal processor receiving an input image signal having a first pedestal level from an image sensor, generating a first signal from the input image signal, the first signal including a second pedestal level, the second pedestal level being different from the first pedestal level and being determined in accordance with the first pedestal level and a processing gain of the image signal processor; generating a second signal having the second pedestal level by amplifying the first signal in accordance with the processing gain; generating a third signal having the second pedestal level by removing a noise signal from the second signal; and generating a fourth signal by subtracting the second pedestal level from the third signal.

According to an exemplary embodiment, an electronic device includes an image sensor to generate an image signal having a first pedestal level added thereto, an image signal processor that generates a display signal from the image signal having the first pedestal level; and a controller to control operations of the image sensor and the image signal processor. The image signal processor includes a processor and a memory with instructions stored thereon, that when executed by the processor generates, based on the image signal, a first signal having a second pedestal level, different from the first pedestal level, added thereto, the second pedestal level being determined in accordance with the first pedestal level and a processing gain of the processor.

According to an exemplary embodiment, a processor implemented method for generating a display signal includes receiving an image signal having a first pedestal level, determining a second pedestal level, different from the first pedestal level, in accordance with the first pedestal level and a processing gain of the image signal processor, generating a first signal from the image signal, the first signal including the second pedestal level, generating a second signal having the second pedestal level by amplifying the first signal in accordance with the processing gain, generating a third signal having the second pedestal level by removing a noise signal from the second signal; and generating a fourth signal by subtracting the second pedestal level from the third signal.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
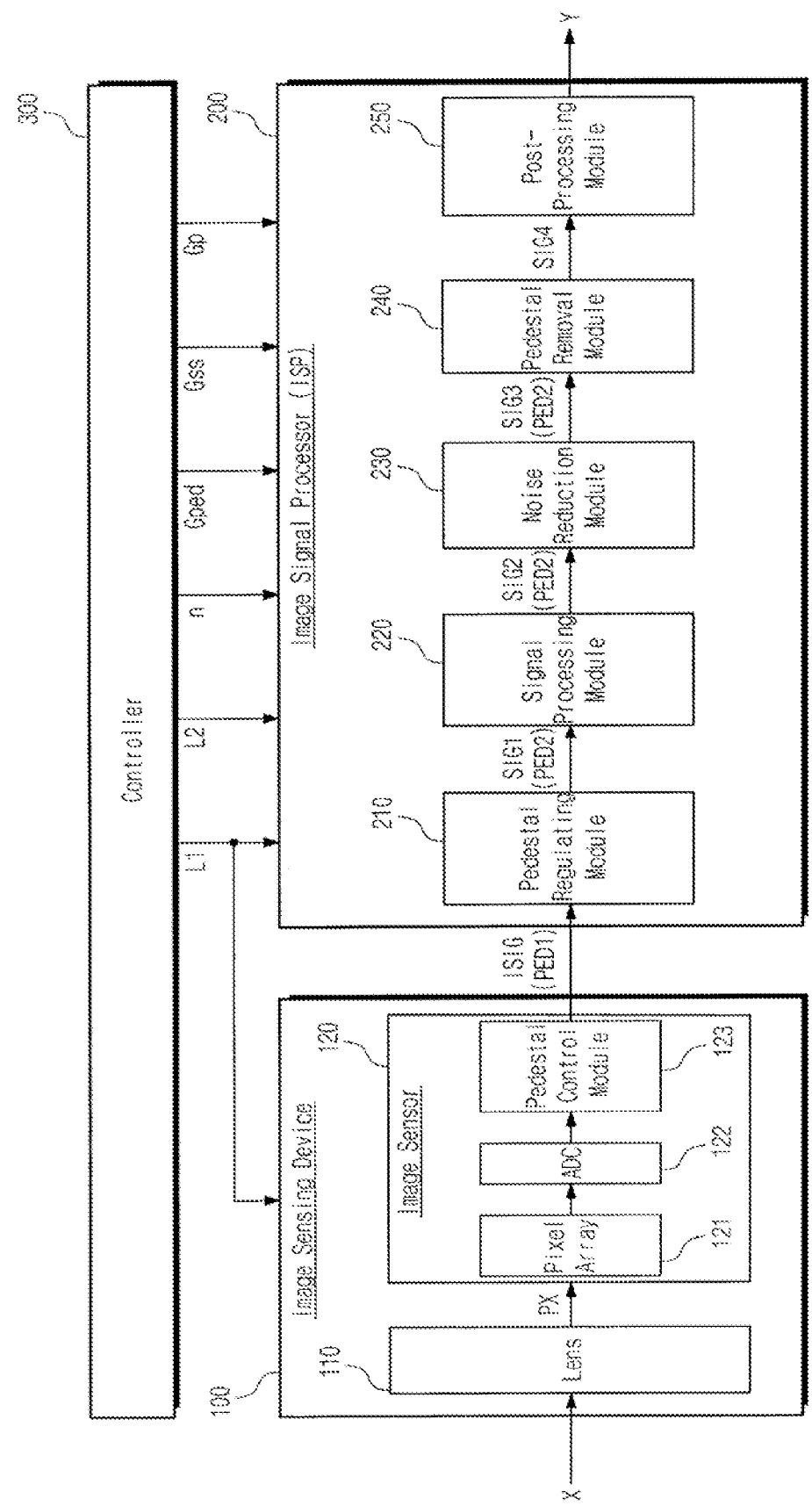
FIG. 1 illustrates a block diagram of an electronic device according to an embodiment.

FIG. 1 is a block diagram illustrating an electronic device according to an embodiment. Referring to FIG. 1, an electronic device 1000 may sense a light signal "X" received from an external object and may generate an output signal "Y" based on the sensed light signal "X". The output signal "Y" may include image data for the external object, which are processed in such a way that the image data may be displayed through a display device. The electronic device 1000 may display an image of the external object generated from the output signal "Y" on an internal display device and/or an external display device.

In an example, the electronic device 1000 may be implemented with a smartphone, a tablet PC, a PMP, a laptop PC, a wearable device, a digital signal processor (DSP), etc. The electronic device 1000 may include any type of device which obtains an image signal associated with an object and processes the obtained image signal.

The electronic device 1000 may include an image sensing device 100, an image signal processor (ISP) 200, and a controller 300. The image sensing device 100 may include a lens 110 and an image sensor 120. The lens 110 may receive the light signal "X". A light signal PX passing through the lens 110 may be provided to the image sensor 120.

The image sensor 120 may output an image signal ISIG based on the received light signal PX. The image sensor 120 may include a pixel array 121, an analog-to-digital converter (ADC) 122, and a pedestal control module 123. The pixel array 121 may receive the transmitted light signal PX. The pixel array 121 may output an electrical signal in response to the transmitted light signal PX. For example, the pixel array 121 may be implemented with a light sensing element, e.g., a photo diode. The ADC 122 may convert the electrical signal output from the pixel array 121 to a digital signal. In particular, the ADC 122 may convert an analog signal from the pixel array 121 and may output a digital signal.

The electrical signal output from the pixel array 121 may include a noise signal generated due to various causes. For example, the electrical signal may include a noise signal generated by a dark current. The dark current is a current automatically generated by the pixel array 121 even though there is no light incident on the pixel array 121. As such, the analog signal input to the ADC 122 may include a signal corresponding to the transmitted light signal PX and a noise signal generated due to various causes including the dark current.

The pedestal control module 123 may receive the digital signal from the ADC 122. The pedestal control module 123 may remove an offset of a particular level generated by a dark current of a digital signal. To prevent an offset-removed signal from having a negative value due to any other noise signal, the pedestal control module 123 may generate a pedestal-added signal by regulating an offset of a digital signal. A pedestal may be an offset of a particular level for preventing an offset-removed signal from having a negative value. That is, the pedestal control module 123 may regulate an offset of a digital signal based on a level of an offset due to a dark current and a level of a pedestal.

As illustrated in FIG. 1, the pedestal control module 123 may generate the image signal ISIG to which a first pedestal PED1 of a first pedestal level L1 is added. The first pedestal level L1 may be provided from the controller 300. An example is illustrated in FIG. 1 as the image signal ISIG is directly generated from the pedestal control module 123. In another implementation, the image signal ISIG output from the image sensor 120 may be a signal generated by performing various signal processing operations on a signal output from the pedestal control module 123.

The image signal processor 200 may generate the output signal "Y" based on the image signal ISIG provided from the image sensing device 100. The image signal processor 200 may operate based on a processing bit width "n". That is, the image signal processor 200 may generate a signal of not more than "n" bits and may process signals of not more than "n" bits.

The image signal processor 200 may include a pedestal regulating module 210, a signal processing module 220, a noise reduction module 230, a pedestal removal module 240, and a post-processing module 250. Alternatively, the image signal processor 200 may further include various modules including a module which performs defective pixel correction or otherwise improve the image signal.

Modules included in an image signal processor according to embodiments may be implemented in the form of software, hardware, or a combination thereof. In an embodiment, the software may be a machine code, firmware, an embedded code, and application software. For example, the hardware may include an electrical circuit, an electronic circuit, a processor, an integrated circuit, integrated circuit cores, a microelectromechanical system (MEMS), or a combination thereof.

The pedestal regulating module 210 may generate a first signal SIG1 based on the image signal ISIG provided from the image sensor 120. The pedestal regulating module 210 may regulate a level of a pedestal included in the image signal ISIG. As such, the first signal SIG1 may include a pedestal having a different level from that of the image signal ISIG.

As illustrated in FIG. 1, the pedestal regulating module 210 may generate the first signal SIG1, in which a second pedestal PED2 of a second pedestal level L2 is included, from the image signal ISIG in which the first pedestal PED1 is included. For example, the second pedestal level L2 may be greater than the first pedestal level L1.

In an example, the pedestal regulating module 210 may remove the first pedestal PED1 of the image signal ISIG and may process the image signal ISIG, from which the first pedestal PED1 is removed, based on a pedestal gain Gped. For example, the pedestal regulating module 210 may reduce a signal range of the image signal ISIG by using the pedestal gain Gped. The pedestal regulating module 210 may add the second pedestal PED2 to the image signal ISIG, the signal range of which is reduced. As such, the first signal SIG1 to which the second pedestal PED2 is added may be generated within the limited processing bit width "n". The pedestal gain Gped will be more fully described with reference to FIG. 3.

An example is illustrated in FIG. 1 as the pedestal regulating module 210 receives the image signal ISIG directly from the image sensor 120. Alternatively, the pedestal regulating module 210 may receive the image signal ISIG processed through any other module of the image signal processor 200. For example, the pedestal regulating module 210 may receive the image signal ISIG in which a defective pixel is corrected by a module performing defective pixel correction. That is, the pedestal regulating module 210 may generate the first signal SIG1 based on the image signal ISIG on which signal processing is performed.

The signal processing module 220 may receive the first signal SIG1. The signal processing module 220 may process the first signal SIG1 based on a processing gain Gp. For example, the signal processing module 220 may amplify the first signal SIG1 based on the processing gain Gp. As such, a noise signal included in the first signal SIG1 may be amplified. That is, the processing gain Gp may indicate any gain value which may change a magnitude of the noise signal. Accordingly, the signal processing module 220 may generate a second signal SIG2 by processing the first signal SIG1.

The signal processing module 220 may perform various operations of performing signal processing based on a gain. For example, the signal processing module 220 may perform at least one of lens shading correction and white balance correction. In this case, the processing gain Gp may be determined based on at least one of a gain for the lens shading correction and a gain for the white balance correction.

The second signal SIG2 output from the signal processing module 220 may include the second pedestal PED2. In an exemplary embodiment, the signal processing module 220 may remove the second pedestal PED2 from the first signal SIG1 before processing the first signal SIG1 based on the processing gain Gp. The signal processing module 220 may process the first signal SIG1, from which the second pedestal PED2 is removed, based on the processing gain Gp. Afterwards, the signal processing module 220 may add the second pedestal PED2 to the processed first signal SIG1. As such, the second signal SIG2 may be a signal to which the second pedestal PED2 is added.

The noise reduction module 230 may receive the second signal SIG2. The noise reduction module 230 may remove a noise signal included in the second signal SIG2. In an exemplary embodiment, the noise signal included in the second signal SIG2 may be a signal amplified based on the processing gain Gp. The noise reduction module 230 may remove the noise signal of the second signal SIG2 and may generate a third signal SIG3 in which the second pedestal PED2 is included.

The pedestal removal module 240 may receive the third signal SIG3. The pedestal removal module 240 may remove the second pedestal PED2 of the third signal SIG3. The pedestal removal module 240 may generate a fourth signal SIG4 which does not include the second pedestal PED2.

In an exemplary embodiment, the pedestal removal module 240 may generate the fourth signal SIG4 by extending a range of a signal, from which the second pedestal PED2 is removed, based on a signal stretching gain Gss. The signal stretching gain Gss will be more fully described with reference to FIG. 3.

The post-processing module 250 may receive the fourth signal SIG4 which does not include the second pedestal PED2. The post-processing module 250 may perform various signal processing operations based on the fourth signal SIG4. For example, the post-processing module 250 may perform sharpening for making an image sharp, gamma correction for regulating a gamma value depending on a display characteristic, color conversion for regulating a red-green-blue (RGB) value, etc. As such, the post-processing module 250 may generate the output signal "Y" by post-processing the fourth signal SIG4.

The controller 300 may control operations of the image sensing device 100 and the image signal processor 200. The controller 300 may provide various control information to the image sensing device 100 and the image signal processor 200. As illustrated in FIG. 1, the controller 300 may provide the first pedestal level L1 to the image sensing device 100. In this case, the image sensor 120 may generate the image signal ISIG, to which the first pedestal PED1 is added, based on the first pedestal level L1.

The controller 300 may provide the image signal processor 200 with the first pedestal level L1, the second pedestal level L2, the processing bit width "n", the pedestal gain Gped, the signal stretching gain Gss, and the processing gain Gp. The image signal processor 200, based on the first pedestal level L1 and the second pedestal level L2, may remove the first pedestal PED1 of the first pedestal level L1 of the image signal ISIG and may add the second pedestal PED2 of the second pedestal level L2 to the image signal ISIG. The image signal processor 200 may process the image signal ISIG within the processing bit width "n" based on the processing bit width "n". As such, the first to fourth signals SIG1 to SIG4 generated in the image signal processor 200 may be a digital signal of not more than "n" bits. The image signal processor 200 may reduce a range of a signal, from which the first pedestal PED1 is removed, based on the pedestal gain Gped. The image signal processor 200 may increase a range of a signal, from which the second pedestal PED2 is removed, based on the signal stretching gain Gss. The image signal processor 200 may amplify a magnitude of a signal, to which the second pedestal PED2 is added, based on the processing gain Gp.

As described above, the image signal processor 200 may regulate a pedestal level of the image signal ISIG provided from the image sensor 120. The image signal processor 200 may regulate the pedestal level to prevent the image signal ISIG from being clipped in signal processing. Accordingly, the image signal processor 200 may minimize occurrence of image artifact. A description associated with clipping of the image signal ISIG will be given with reference to FIGS. 2A and 2B.

Figure 2A:
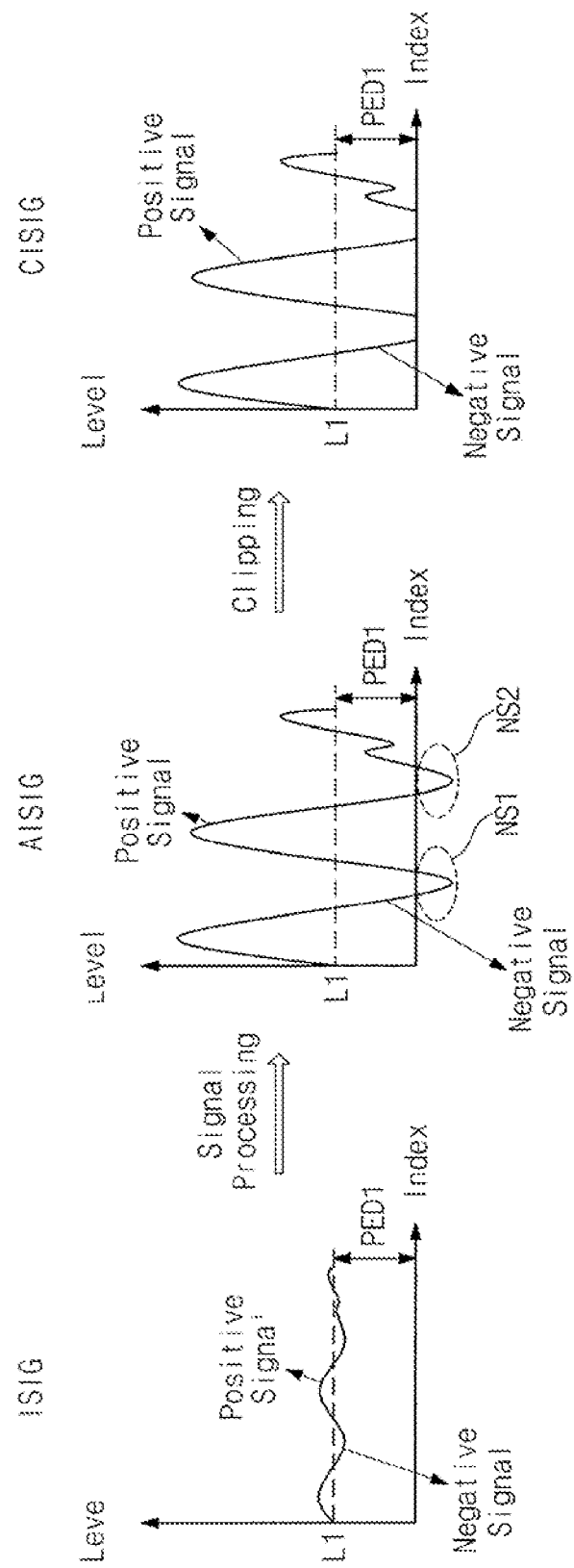
FIG. 2A illustrates a diagram of an example in which clipping occurs at an image signal in the case where a pedestal level is not regulated.
Figure 2B:
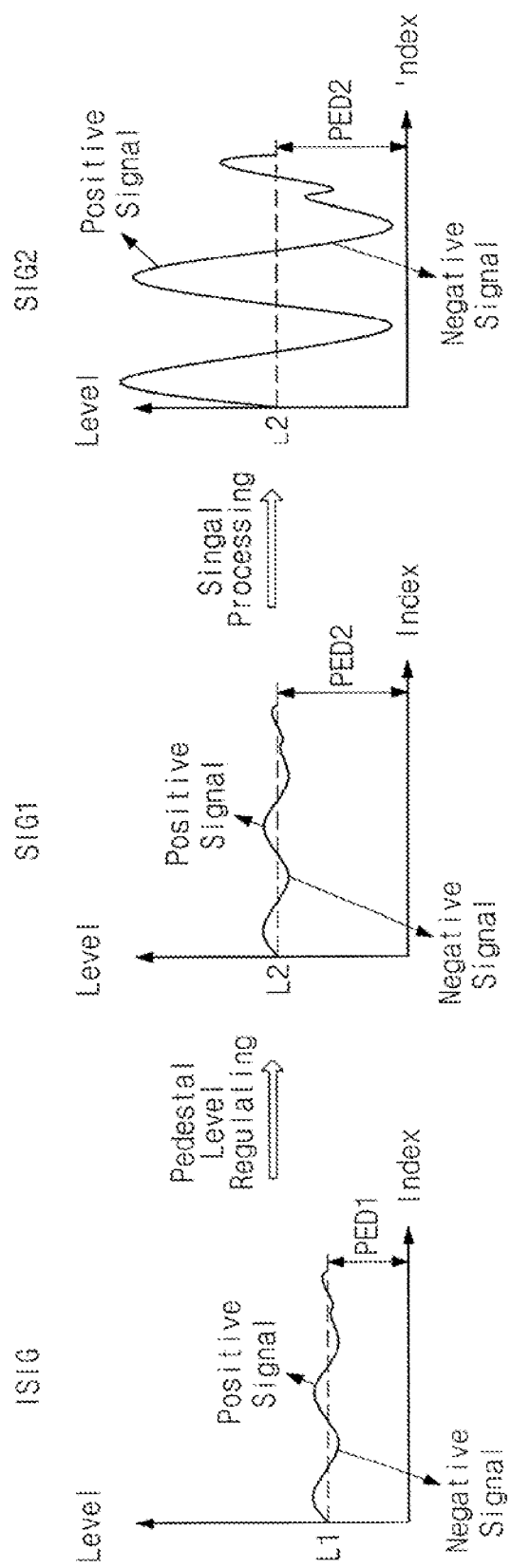
FIG. 2B illustrates a diagram of an example in which no clipping occurs at an image signal in the case where a pedestal level is regulated according to an embodiment.

FIG. 2A is a diagram illustrating an example in which clipping occurs in an image signal when a pedestal level is not regulated. FIG. 2B is a diagram illustrating an example in which no clipping occurs in an image signal when a pedestal level is regulated according to an embodiment. In FIGS. 2A and 2B, a horizontal axis represents an index of a pixel, and a vertical axis represents a level of a pixel. Below, for convenience of description, a signal having a value greater than a particular pedestal level (e.g., the first pedestal level L1 or the second pedestal level L2) is defined as a positive signal and a signal having a value smaller than the particular pedestal level is defined as a negative signal.

Referring to FIG. 2A, an image signal processor may receive the image signal ISIG. The image signal ISIG may include the first pedestal PED1. Due to a noise signal, the image signal ISIG may have a value greater than or less than the first pedestal level L1. The image signal processor may not regulate the first pedestal PED1 of the image signal ISIG, but may perform signal processing on the image signal ISIG. A magnitude of the image signal ISIG may be amplified by the signal processing. Values of a first negative signal NS1 and a second negative signal NS2 of an amplified image signal AISIG may exceed a range of a value (e.g., a positive value) which the image signal processor may process. As such, the first negative signal NS1 and the second negative signal NS2 may be clipped. In the case where the first negative signal NS1 and the second negative signal NS2 are clipped, the image signal processor may perform noise removal based on a clipped image signal CISIG. A value of the clipped image signal CISIG may change in the noise removal process. Accordingly, in the case where an image is generated based on the clipped image signal CISIG, image artifact may occur.

Referring to FIG. 2B, the image signal processor 200 of FIG. 1 may receive the image signal ISIG. The image signal ISIG may include the first pedestal PED1. Due to a noise signal, the image signal ISIG may have a value greater than or less than the first pedestal level L1. The image signal processor 200 may regulate a pedestal level of the image signal ISIG and may generate the first signal SIG1 in which the second pedestal PED2 is included. The second pedestal level L2 may be greater than the first pedestal level L1. The image signal processor 200 may perform signal processing on the first signal SIG1. A magnitude of the first signal SIG1 may be amplified by the signal processing. The second signal SIG2 generated as a result of the amplification may not exceed a range of a value which the image signal processor 200 may process. As such, the second signal SIG2 may be a signal which is not clipped. Accordingly, occurrence of image artifact may decrease.

As illustrated in FIG. 2A, when a magnitude of the amplified image signal AISIG is greater than a value of an added pedestal, clipping may occur at the image signal ISIG. As illustrated in FIG. 2B, when a magnitude of the amplified image signal ISIG is smaller than a value of an added pedestal (i.e., a level of a pedestal), clipping may not occur at the image signal ISIG. That is, depending on a magnitude of an amplified noise signal and a value of a pedestal, clipping may or may not occur at the image signal ISIG.

Figure 3:
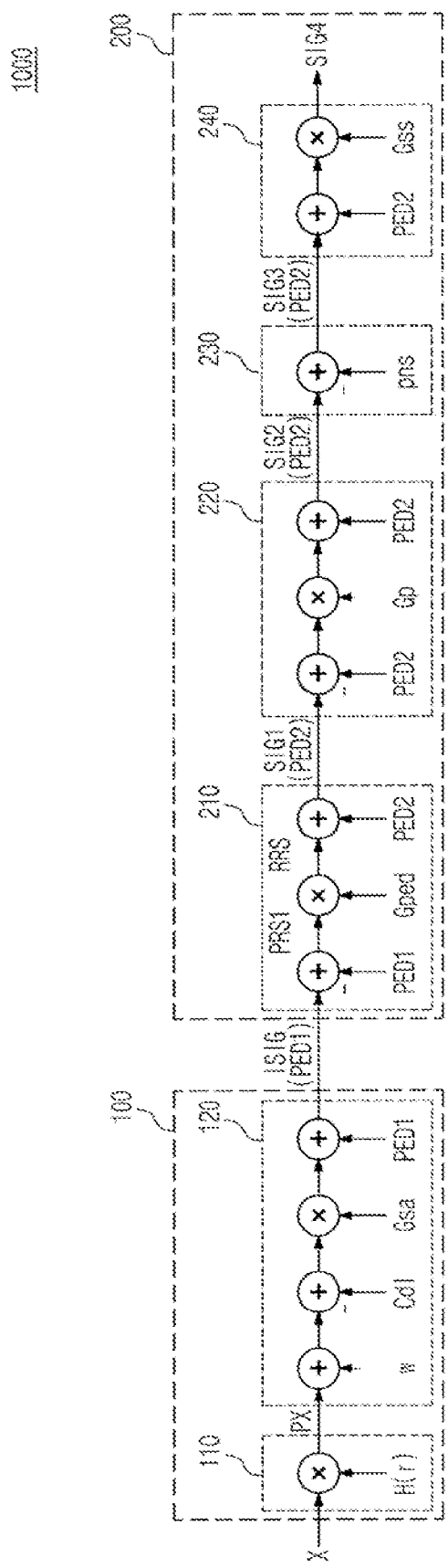
FIG. 3 illustrates a diagram of an example of an electronic device of FIG. 1 implemented by modeling functions of an electronic device of FIG. 1.

Below, an operation of the image signal processor 200 of FIG. 1 will be described with reference to FIG. 3. FIG. 3 is a diagram illustrating an example of an electronic device of FIG. 1 implemented by modeling functions of the electronic device of FIG. 1. FIG. 3 is only an example, and may further include various functions (e.g., a function of the post-processing module 250 of FIG. 1) in addition to functions modeled in FIG. 3.

Referring to FIG. 3, the lens 110 may receive the light signal "X" and may output the transmitted light signal PX. The transmitted light signal PX may have a different value from the light signal "X" depending on a lens shading (i.e., vignetting) model H(r).

The image sensor 120 may receive the transmitted light signal PX and may output the image signal ISIG. A noise signal "w" may be added to the transmitted light signal PX, an offset Cdl according to a dark current may be removed, a lens gain Gsa may be multiplied, and the first pedestal PED1 may be added. As such, the image signal ISIG may be generated. The image signal ISIG may be provided to the image signal processor 200. According to the above description, the image signal ISIG may include a noise signal "w−Cdl" corresponding to a difference between the noise signal "w" and the offset Cdl.

The pedestal regulating module 210 may remove the first pedestal PED1 from the image signal ISIG. The pedestal regulating module 210 may process a first pedestal removal signal PRS1 based on the pedestal gain Gped. For example, the pedestal regulating module 210 may reduce a signal range of the first pedestal removal signal PRS1 by using the pedestal gain Gped. The pedestal regulating module 210 may add the second pedestal PED2 to a signal range reduction signal RRS, the signal range of which is reduced. For example, the pedestal regulating module 210 may add the second pedestal PED2 depending on a reduced signal range value of the signal range reduction signal RRS. Accordingly, the second pedestal PED2 of the second pedestal level L2 greater than the first pedestal level L1 may be added. As such, the pedestal regulating module 210 may generate the first signal SIG1 having the second pedestal PED2 added thereto. The first signal SIG1 may be provided to the signal processing module 220. That is, an operation of the pedestal regulating module 210 may be expressed by the following Equation 1.

$$\text{Out}=(\text{In}-\text{PED1})\times G_{ped}+\text{PED2} \quad \text{[Equation 1]}$$

In Equation 1, an input signal In may be the image signal ISIG, and an output signal Out may be the first signal SIG1.

The signal processing module 220 may remove the second pedestal PED2 from the first signal SIG1. The signal processing module 220 may process a signal, from which the second pedestal PED2 is removed, based on the processing gain Gp. For example, the signal processing module 220 may amplify a signal, from which the second pedestal PED2 is removed, based on the processing gain Gp. The signal processing module 220 may generate the second signal SIG2 by adding the second pedestal PED2 to the amplified first signal SIG1. The signal processing module 220 may provide the noise reduction module 230 with the second signal SIG2 to which the second pedestal PED2 has been added. That is, an operation of the signal processing module 220 may be expressed by the following Equation 2.

$$\text{Out}=(\text{In}-\text{PED2})\times G_p+\text{PED2} \quad \text{[Equation 2]}$$

In Equation 2, an input signal In may be the first signal SIG1, and an output signal Out may be the second signal SIG2.

The noise reduction module 230 may remove a noise signal pns from the second signal SIG2. In an exemplary embodiment, the noise signal pns may be a prediction signal associated with the noise signal "w−Cdl" included in the image signal ISIG. The noise reduction module 230 may generate the third signal SIG3 not including the noise signal pns. The noise reduction module 230 may provide the pedestal removal module 240 with the third signal SIG3 to which the second pedestal PED2 has been added.

The pedestal removal module 240 may remove the second pedestal PED2 from the third signal SIG3. The pedestal removal module 240 may process a second pedestal removal signal PRS2 based on the signal stretching gain Gss. For example, the pedestal removal module 240 may extend a signal range of the second pedestal removal signal PRS2 within the processing bit width "n" by using the signal stretching gain Gss. As such, the pedestal removal module 240 may generate the fourth signal SIG4 which does not include the second pedestal PED2. That is, an operation of the pedestal removal module 240 may be expressed by the following Equation 3.

$$\text{Out}=(\text{In}-\text{PED2})\times G_{SS} \quad \text{[Equation 3]}$$

In Equation 3, an input signal In may be the third signal SIG3 and an output signal Out may be the fourth signal SIG4.

Below, a method of determining the second pedestal level L2, the pedestal gain Gped, and the signal stretching gain Gss will be described in detail.

In the example of FIG. 3, a relationship between the light signal "X" and the second signal SIG2 may be expressed by the following Equation 4.

$$\text{SIG2}=G_p \cdot G_{ped} \cdot H(r) \cdot X + G_p \cdot G_{ped} \cdot G_{sa}(w-C_{dl})+\text{PED2} \quad \text{[Equation 4]}$$

In Equation 4, the light signal "X", the value of which varies with the lens shading model H(r), is amplified according to the pedestal gain Gped and the processing gain Gp. The noise signal "w−Cdl" may be amplified according to the lens gain Gsa, the pedestal gain Gped, and the processing gain Gp.

When a value of the second pedestal PED2 (i.e., the second pedestal level L2) is smaller than an amplified value of the noise signal "w−Cdl", clipping of the image signal ISIG may occur. As such, the second pedestal PED2 may satisfy the following Equation 5 for the purpose of preventing an amplified noise signal from being clipped.

$$\text{PED2} > G_p \cdot G_{ped} \cdot G_{sa}(w-C_{dl}) \quad \text{[Equation 5]}$$

In Equation 5, a value of the second pedestal PED2 is greater than a magnitude of the amplified noise signal.

The second pedestal level L2 may be determined such that the value of the second pedestal PED2 becomes greater than the magnitude of the amplified noise signal. In an exemplary embodiment, the second pedestal level L2 may be determined based on the first pedestal level L1 and the processing gain Gp. For example, the second pedestal level L2 may be calculated by the following Equation 6.

$$L2 = L1 \times G_p \qquad \text{[Equation 6]}$$

In Equation 6, the second pedestal level L2 is calculated by multiplying the first pedestal level L1 and the processing gain Gp. That is, the second pedestal level L2 may vary with the first pedestal level L1 and the processing gain Gp. For example, the processing gain Gp may be a value obtained by multiplying a gain for the lens shading correction and a gain for the white balance correction together.

The pedestal gain Gped may be determined such that the value of the second pedestal PED2 becomes greater than the magnitude of the amplified noise signal. In an exemplary embodiment, the pedestal gain Gped may be determined based on the processing bit width "n", the first pedestal level L1 and the processing gain Gp. For example, the pedestal gain Gped may be calculated by the following Equation 7.

$$G_{ped} = \frac{2^n - L1 \times G_p}{2^n - L1} \qquad \text{[Equation 7]}$$

In Equation 7, when a signal is amplified by using the processing gain Gp (i.e., in the case where the processing gain Gp is greater than "1"), the pedestal gain Gped is less than "1". As such, an amplified magnitude of the noise signal "w−Cdl" decreases with the pedestal gain Gped. That is, a value of the second pedestal PED2 may become greater than a magnitude of an amplified noise signal depending on the pedestal gain Gped. For example, the processing gain Gp may be a value which is obtained by multiplying a gain for the lens shading correction and a gain for the white balance correction together.

As described above, to prevent the image signal ISIG from being clipped, the second pedestal level L2 and the pedestal gain Gped may be determined.

The controller 300 of FIG. 1 may calculate the second pedestal level L2 and the pedestal gain Gped, and provide them to the image signal processor 200. The pedestal regulating module 210 may process the image signal ISIG based on the pedestal gain Gped provided from the controller 300, and may generate the first signal SIG1, to which the second pedestal level L2 is added, based on the second pedestal level L2 provided from the controller 300.

The signal stretching gain Gss may be determined based on the second pedestal level L2 and the processing bit width "n". For example, the signal stretching gain Gss may be calculated by the following Equation 8.

$$G_{SS} = \frac{2^n}{2^n - L2} \qquad \text{[Equation 8]}$$

In Equation 8, since the second pedestal level L2 has a positive value, the signal stretching gain Gss has a value greater than "1". Accordingly, when the second pedestal removal signal PRS2 is processed based on the signal stretching gain Gss, a signal range of the second pedestal removal signal PRS2 may be extended. As such, a signal range of the image signal ISIG, which is decreased due to addition of the second pedestal PED2, may be extended.

The controller 300 of FIG. 1 may calculate the signal stretching gain Gss, and may provide the calculated signal stretching gain Gss to the image signal processor 200. The pedestal removal module 240 may extend a signal range of the second pedestal removal signal PRS2 based on the signal stretching gain Gss provided from the controller 300.

Figure 4:
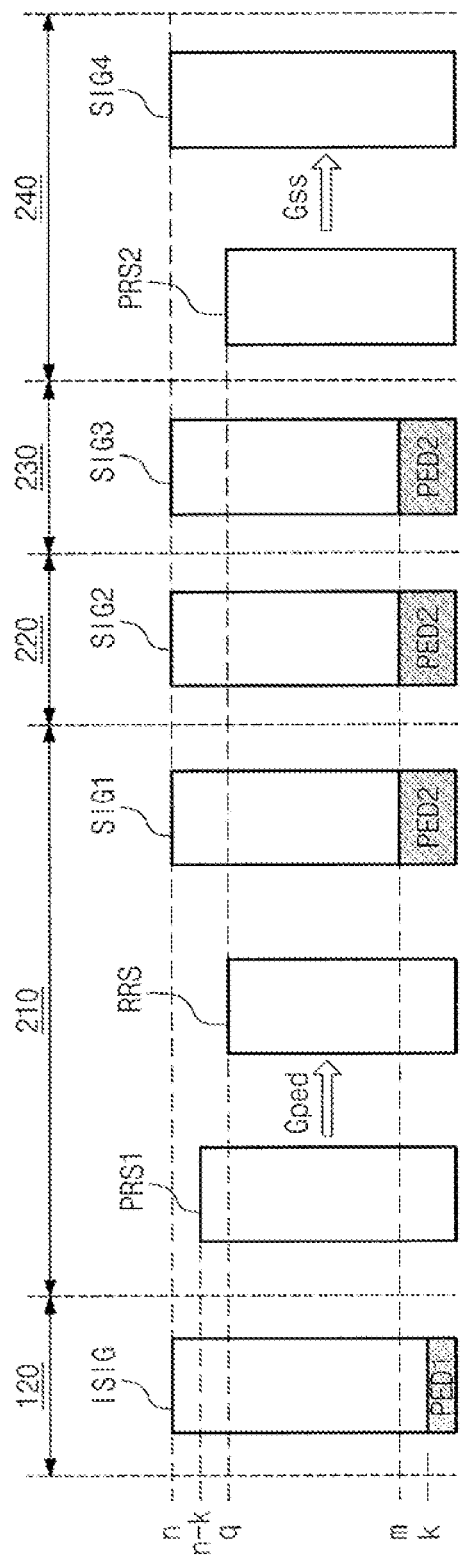
FIG. 4 illustrates a diagram of an example of a change of a bit width of signals of FIG. 3.

FIG. 4 is a diagram illustrating an example of a change of a bit width of signals of FIG. 3. Referring to FIGS. 3 and 4, the image signal ISIG provided from the image sensor 120 may be an n-bit signal including the first pedestal PED1. The n-bit image signal ISIG may include the first pedestal PED1 of "k" bits.

The pedestal regulating module 210 may remove the first pedestal PED1 from the image signal ISIG. Since the first pedestal PED1 is composed of "k" bits, the first pedestal removal signal PRS1 may be composed of (n-k) bits.

The pedestal regulating module 210 may reduce a signal range by using the pedestal gain Gped. As such, a bit width of the first pedestal removal signal PRS1 may be reduced. The generated signal range reduction signal RRS may be composed of "q" bits. That is, the signal range reduction signal RRS may be a signal having a bit width reduced as much as (n-q) bits compared with the processing bit width "n". The pedestal regulating module 210 may add the second pedestal PED2 of "m" bits to the signal range reduction signal RRS. The bit width "m" of the second pedestal PED2 may be greater than the bit width "k" of the first pedestal PED1. The bit width "m" of the second pedestal PED2 may be identical to the reduced bit width (n-q). As such, the first signal SIG1 generated from the pedestal regulating module 210 may be composed of "n" bits.

The signal processing module 220 may generate the second signal SIG2 by removing the second pedestal PED2 of the first signal SIG1, performing signal processing, and again adding the second pedestal PED2. The signal processing module 220 may perform signal processing such that a bit width of the second signal SIG2 is composed of "n" bits or less. As such, the second signal SIG2 generated from the signal processing module 220 may be composed of "n" bits.

The noise reduction module 230 may remove a noise signal from the second signal SIG2 and may generate the third signal SIG3 of "n" bits.

The pedestal removal module 240 may generate the second pedestal removal signal PRS2 by removing the second pedestal PED2 from the third signal SIG3. Since the second pedestal PED2 is composed of "m" bits and "m" bits are identical in number to (n-q) bits, the second pedestal removal signal PRS2 may be a q-bit signal. The pedestal removal module 240 may increase a signal range of the second pedestal removal signal PRS2 based on the signal stretching gain Gss. As such, a bit width of the second pedestal removal signal PRS2 may be extended. The pedestal removal module 240 may generate the fourth signal SIG4 by further increasing the bit width "q" of the second pedestal removal signal PRS2 as much as the bit width "m" of the second pedestal PED2. As such, the fourth signal SIG4 may be an n-bit signal.

As described above, the image signal processor 200 may process a signal within the processing bit width "n" and may generate a signal. The image signal processor 200 may reduce a bit width of the image signal ISIG based on the pedestal gain Gped. In this case, even though the second pedestal PED2 is added, signals which are processed or generated at the image signal processor 200 do not exceed the limited processing bit width "n". Accordingly, the image signal processor 200 may regulate a pedestal level such that an amplified signal is not clipped, without an increase in costs according to addition of an extra bit(s) to the processing bit width "n" (e.g., according to an increase of the processing bit width from "n" to "n+1").

Also, the image signal processor 200 may remove a pedestal and may extend a bit width of a pedestal-removed signal up to the processing bit width "n". Accordingly, even though a pedestal level is dynamically regulated by the image signal processor 200, a signal range of the image signal ISIG may not be reduced.

A description is given with reference to FIG. 4 as each of the image signal ISIG and the first to fourth signals SIG1 to SIG4 is composed of "n" bits. Alternatively, a bit width of the image signal ISIG may be different from a bit width of the first to fourth signals SIG1 to SIG4.

Also, a description is given with reference to FIG. 4 as a bit width of a signal is changed by regulating a pedestal level, reducing a signal range, and extending a signal range. For example, through the operations of regulating a pedestal level, reducing a signal range, and extending a signal range, a signal value may change while a bit width of a signal is identically maintained.

Figure 5:
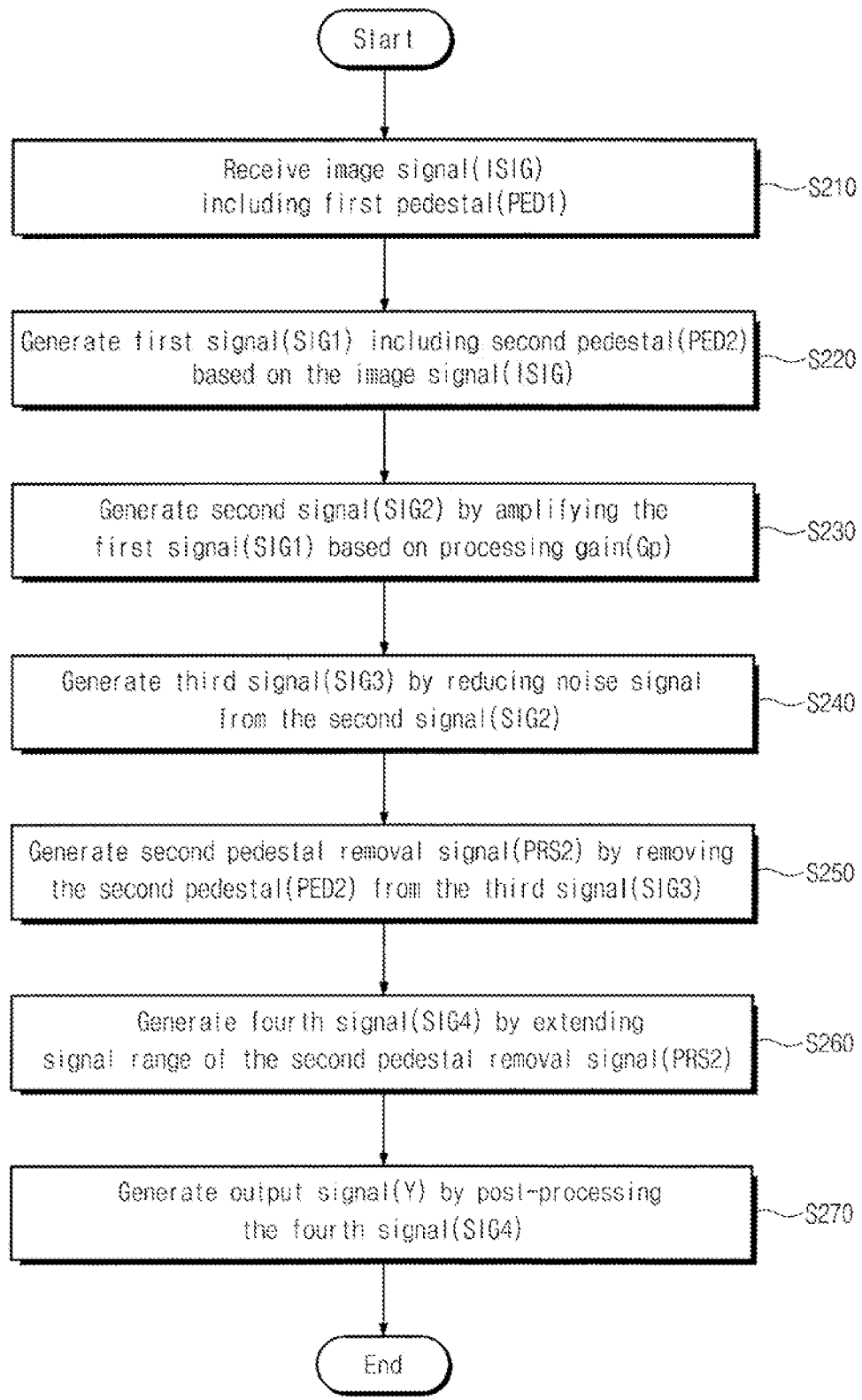
FIG. 5 illustrates a flowchart of an operation of an image signal processor of FIG. 1.

FIG. 5 is a flowchart illustrating an operation of an image signal processor of FIG. 1. Referring to FIGS. 1, 3, and 5, in operation S210, the image signal processor 200 may receive the image signal ISIG to which the first pedestal PED1 is added. In operation S220, the image signal processor 200 may generate the first signal SIG1, to which the second pedestal PED2 is added, based on the image signal ISIG. The level L2 of the second pedestal PED2 may be greater than the level L1 of the first pedestal PED1.

In operation S230, the image signal processor 200 may generate the second signal SIG2 by amplifying the first signal SIG1, based on the processing gain Gp. In operation S240, the image signal processor 200 may generate the third signal SIG3 by removing a noise signal from the second signal SIG2. In operation S250, the image signal processor 200 may generate the second pedestal removal signal PRS2 by removing the second pedestal PED2 from the third signal SIG3. In operation S260, the image signal processor 200 may generate the fourth signal SIG4 by extending a signal range of the second pedestal removal signal PRS2. In operation S270, the image signal processor 200 may generate the output signal "Y" by post-processing the fourth signal SIG4.

Figure 6:
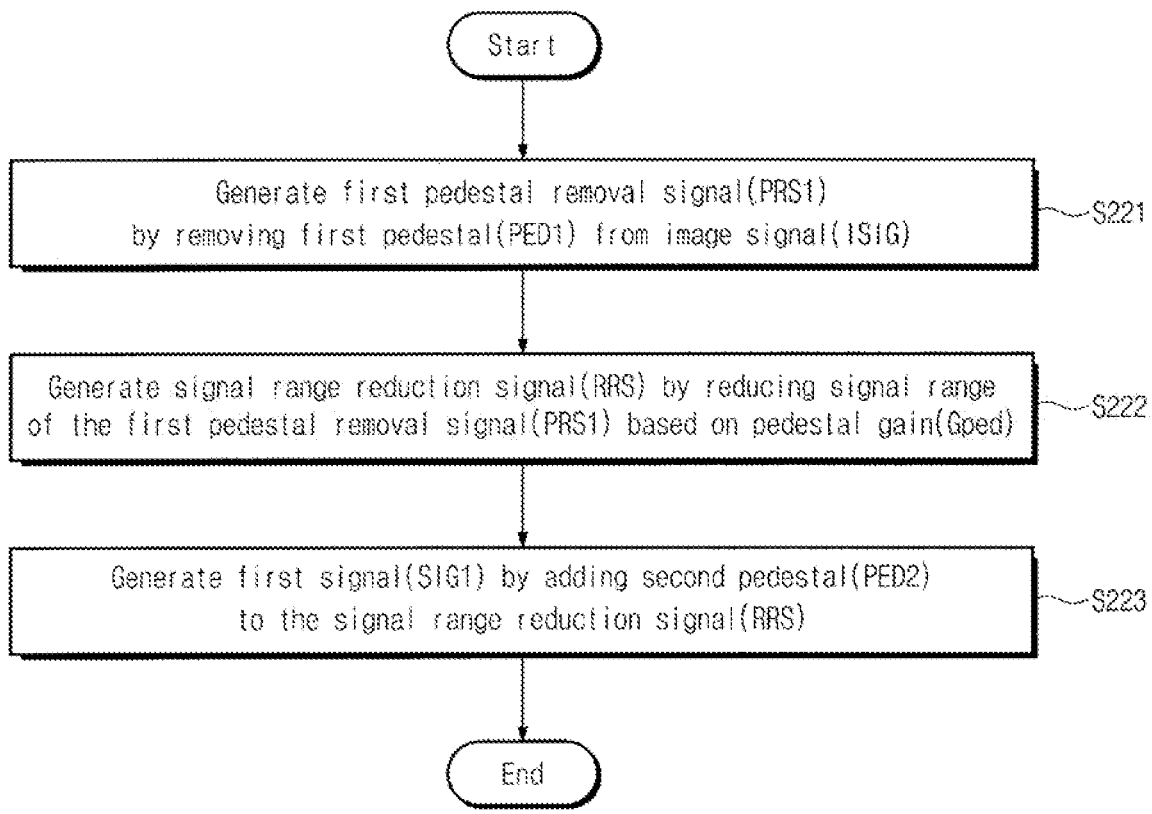
FIG. 6 illustrates a flowchart of an operation in which an image signal processor of FIG. 1 regulates a pedestal level of an image signal.

FIG. 6 is a flowchart illustrating an operation in which an image signal processor of FIG. 1 regulates a pedestal level of an image signal. Referring to FIGS. 1, 3, and 6, in operation S221, the image signal processor 200 may generate the first pedestal removal signal PRS1 by removing the first pedestal PED1 from the image signal ISIG. In operation S222, the image signal processor 200 may generate the signal range reduction signal RRS by reducing a signal range of the first pedestal removal signal PRS1 based on the pedestal gain Gped. In operation S223, the image signal processor 200 may generate the first signal SIG1 by adding the second pedestal PED2 to the signal range reduction signal RRS.

Figure 7:
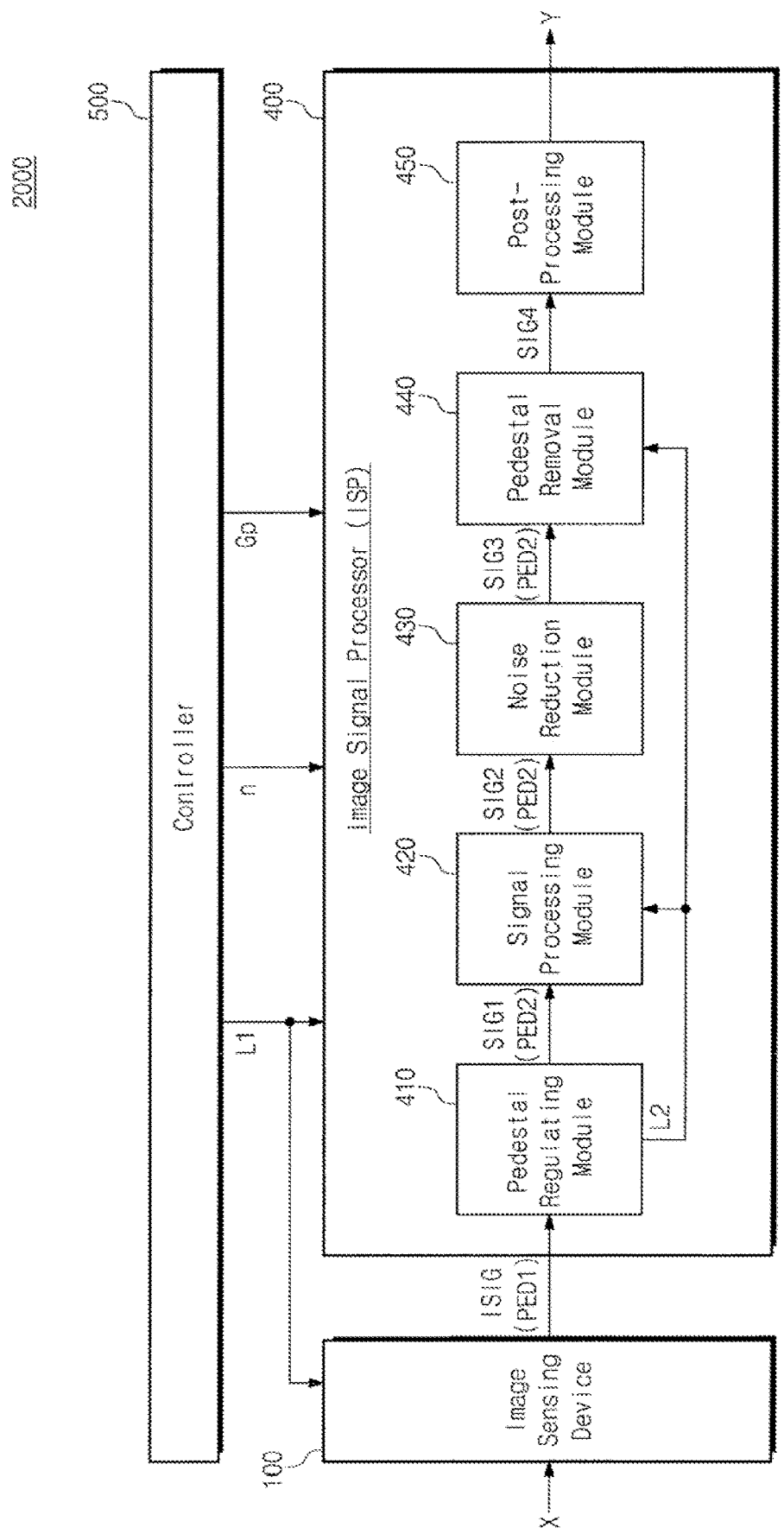
FIG. 7 illustrates a block diagram of an electronic device according to an embodiment.

FIG. 7 is a block diagram illustrating an electronic device according to another embodiment. Referring to FIG. 7, an electronic device 2000 may include the image sensing device 100, an image signal processor 400, and a controller 500. The image signal processor 400 may include a pedestal regulating module 410, a signal processing module 420, a noise reduction module 430, a pedestal removal module 440, and a post-processing module 450. An operation of the image sensing device 100 may be substantially identical to the operation of the image sensing device 100 of FIG. 1. Operations of the pedestal regulating module 410, the signal processing module 420, the noise reduction module 430, the pedestal removal module 440, and the post-processing module 450 may be similar to the operations of the pedestal regulating module 210, the signal processing module 220, the noise reduction module 230, the pedestal removal module 240, and the post-processing module 250 of FIG. 1. Below, differences between the electronic device 1000 of FIG. 1 and the electronic device 2000 of FIG. 7 will be described.

Referring to FIG. 7, the controller 500 may transfer the first pedestal level L1, the processing bit width "n", and the processing gain Gp to the image signal processor 400.

The pedestal regulating module 410 may remove the first pedestal PED1 from the image signal ISIG. The pedestal regulating module 410 may reduce a signal range of the image signal ISIG, from which the first pedestal PED1 is removed, based on the pedestal gain Gped. The pedestal regulating module 410 may generate the first signal SIG1 by adding the second pedestal PED2 to the image signal ISIG, the signal range of which is reduced.

Unlike the pedestal regulating module 210 of FIG. 1, the pedestal regulating module 410 may calculate the pedestal gain Gped and the second pedestal level L2. In an exemplary embodiment, the pedestal regulating module 410 may calculate the second pedestal level L2 based on the first pedestal level L1 and the processing gain Gp as expressed in Equation 6. The pedestal regulating module 410 may calculate the pedestal gain Gped based on the first pedestal level L1, the processing gain Gp and the processing bit width "n" in accordance with Equation 7.

The pedestal regulating module 410 may transfer the calculated second pedestal level L2 to the signal processing module 420 and the pedestal removal module 440.

The signal processing module 420 may remove the second pedestal PED2 of the first signal SIG1. The signal processing module 420 may amplify a signal, from which the second pedestal PED2 is removed, based on the processing gain Gp. The signal processing module 420 may generate the second signal SIG2 by adding the second pedestal PED2 to the amplified signal.

Unlike the signal processing module 220 of FIG. 1, the signal processing module 420 may receive the second pedestal level L2 from the pedestal regulating module 410 rather than from the controller 500. The signal processing module 420 may remove the second pedestal PED2 of the first signal SIG1 depending on the second pedestal level L2 and may add the second pedestal PED2 to the amplified signal.

The noise reduction module 430 may generate the third signal SIG3 by removing a noise signal from the second signal SIG2.

The pedestal removal module 440 may remove the second pedestal PED2 of the third signal SIG3. The pedestal removal module 440 may extend a signal range of a signal, from which the second pedestal PED2 is removed, based on the signal stretching gain Gss. As such, the fourth signal SIG4 may be generated.

Unlike the pedestal removal module 240 of FIG. 1, the pedestal removal module 440 may receive the second pedestal level L2 from the pedestal regulating module 410 rather than from the controller 500. The pedestal removal module 440 may remove the second pedestal PED2 of the third signal SIG3 based on the second pedestal level L2. The pedestal removal module 440 may calculate the signal stretching gain Gss. In an exemplary embodiment, the pedestal removal module 440 may calculate the signal stretching gain Gss based on the processing bit width "n" and the second pedestal level L2 as expressed in Equation 8.

The post-processing module 450 may generate the output signal "Y" by performing various signal processing operations based on the fourth signal SIG4.

As described above, the operation of the electronic device 2000 may be identical to the operation of the electronic device 1000 except that the image signal processor 400, rather than the controller 500, calculates the second pedestal level L2, the pedestal gain Gped, and the signal stretching gain Gss. Accordingly, the first to fourth signals SIG1 to SIG4 generated at the image signal processor 400 may be identical to the first to fourth signals SIG1 to SIG4 generated at the image signal processor 200 of FIG. 1.

According to the electronic device 2000 of FIG. 7, since the image signal processor 400 calculates the second pedestal level L2, the pedestal gain Gped, and the signal stretching gain Gss, hardware or software of a controller may not be changed to calculate the second pedestal level L2, the pedestal gain Gped, and the signal stretching gain Gss. That is, the electronic device 2000 may be implemented only by changing hardware or software of an image signal processor.

Figure 8:
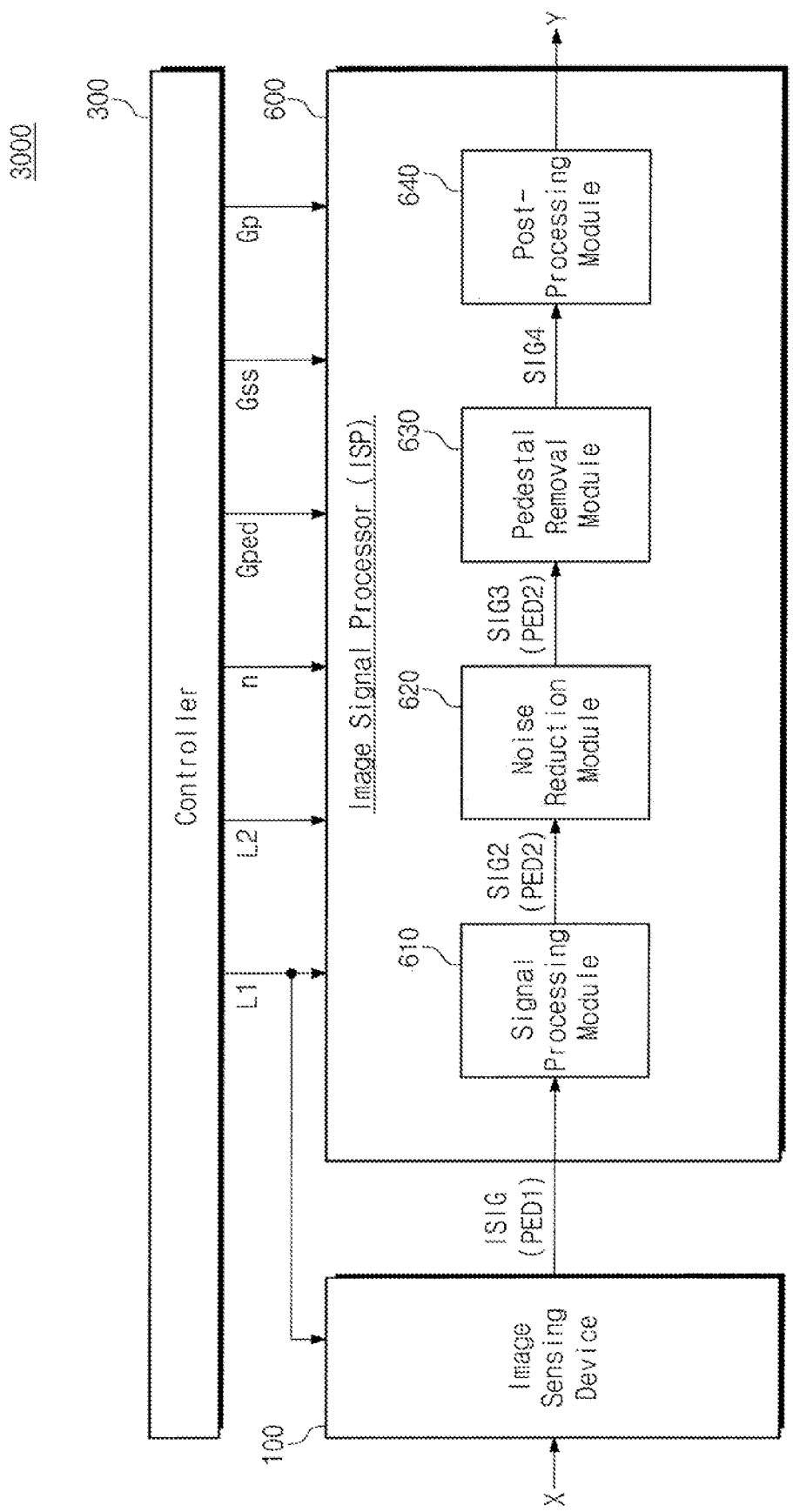
FIG. 8 illustrates a block diagram of an electronic device according to an embodiment.

FIG. 8 is a block diagram illustrating an electronic device according to another embodiment. Referring to FIG. 8, an electronic device 3000 may include the image sensing device 100, an image signal processor 600, and the controller 300. The image signal processor 600 may include a signal processing module 610, a noise reduction module 620, a pedestal removal module 630, and a post-processing module 640. Operations of the image sensing device 100 and the controller 300 of FIG. 8 may be substantially identical to the operations of the image sensing device 100 and the controller 300 of FIG. 1. Operations of the signal processing module 610, the noise reduction module 620, the pedestal removal module 630, and the post-processing module 640 may be similar to the operations of the signal processing module 220, the noise reduction module 230, the pedestal removal module 240, and the post-processing module 250 of FIG. 1. Below, differences between the electronic device 1000 of FIG. 1 and the electronic device 3000 of FIG. 8 will be described.

Referring to FIG. 8, the signal processing module 610 may remove the first pedestal PED1 from the image signal ISIG. The signal processing module 610 may process a signal, from which the first pedestal PED1 is removed, based on the pedestal gain Gped and the processing gain Gp. A signal range of the signal from which the first pedestal PED1 is removed may be reduced based on the pedestal gain Gped, and a magnitude thereof may be amplified based on the processing gain Gp. For example, the signal processing module 610 may perform at least one of lens shading correction and white balance correction. In this case, the processing gain Gp may be calculated based on at least one of the lens shading correction and the white balance correction.

The signal processing module 610 may generate the second signal SIG2 by adding the second pedestal PED2 to the processed signal. That is, the signal processing module 610 may include functions of the pedestal regulating module 210 and the signal processing module 220 of FIG. 1. Accordingly, the second signal SIG2 generated at the signal processing module 610 may be identical to the second signal SIG2 of FIG. 1.

Afterwards, operations of the noise reduction module 620, the pedestal removal module 630, and the post-processing module 640 may be similar to the operations of the noise reduction module 230, the pedestal removal module 240, and the post-processing module 250 of FIG. 1.

As illustrated in FIG. 8, the second pedestal level L2 and the pedestal gain Gped may be provided from the controller 300. Alternatively, the signal processing module 610 may calculate the second pedestal level L2 and the pedestal gain Gped based on the first pedestal level L1, the processing bit width "n", and the processing gain Gp provided from the controller 300.

As described above, the image signal processor 600 may regulate a pedestal level through the signal processing module 610. Accordingly, the image signal processor 600 may not separately include a module corresponding to the pedestal regulating module 210 of FIG. 1. In the case where a pedestal level is regulated at the signal processing module 610, the image signal processor 600 may not include separate hardware or software corresponding to the pedestal regulating module 210 of FIG. 1. Accordingly, the chip area of the image signal processor 600 may decrease, and the image signal processor 600 may generate the output signal "Y" from the image signal ISIG quickly.

Figure 9:
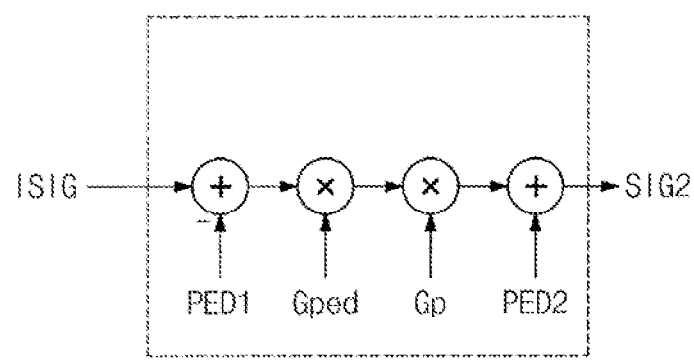
FIG. 9 illustrates a diagram of an example of a signal processing module implemented by modeling a function of a signal processing module of FIG. 8.

FIG. 9 is a diagram illustrating an example of a signal processing module implemented by modeling a function of a signal processing module of FIG. 8. Referring to FIG. 9, the signal processing module 610 may remove the first pedestal PED1 from the image signal ISIG. The signal processing module 610 may process a signal, from which the first pedestal PED1 is removed, based on the pedestal gain Gped and the processing gain Gp. In an exemplary embodiment, a signal range of a signal from which the first pedestal PED1 is removed may be reduced based on the pedestal gain Gped. A magnitude of the signal, the signal range of which is reduced, may be amplified based on the processing gain Gp. For example, the signal processing module 610 may process a signal, from which the first pedestal PED1 is removed, based on a gain obtained by multiplying the pedestal gain Gped and the processing gain Gp together. The signal processing module 610 may generate the second signal SIG2 by adding the second pedestal PED2 to the processed signal. That is, an operation of the signal processing module 610 may be expressed by the following Equation 9.

$$\text{Out} = (\text{In} - \text{PED1}) \times G_{ped} \cdot G_p + \text{PED2} \quad \text{[Equation 9]}$$

In Equation 9, an input signal In may be the image signal ISIG, and an output signal Out may be the second signal SIG2.

As understood from a result of comparing Equation 2 indicating the operation of the signal processing module 220 of FIG. 1 and Equation 9 indicating the operation of the signal processing module 610 of FIG. 9, in the case of Equation 2, the second pedestal PED2 is removed from the input signal In, and the signal from which the second pedestal PED2 is removed is multiplied by the processing gain Gp; in the case of Equation 9, the first pedestal PED1 is removed from the input signal In, and the signal from which the first pedestal PED1 is removed is multiplied by the pedestal gain Gped and the processing gain Gp. That is, in the case where a pedestal value and a gain value are regulated at the signal processing module 220 of FIG. 1 (e.g., in the case where a value of the second pedestal PED2 is regulated to a value of the first pedestal PED1, a value of the processing gain Gp is regulated to a value obtained by multiplying the pedestal gain Gped and the processing gain Gp together), the signal processing module 610 of FIG. 8 may be implemented. Accordingly, the image signal processor 600 of FIG. 8 may be implemented only by changing a parameter of hardware corresponding to the signal processing module 220 of FIG. 1 without adding separate hardware corresponding to the pedestal regulating module 210 of FIG. 1.

Figure 10:
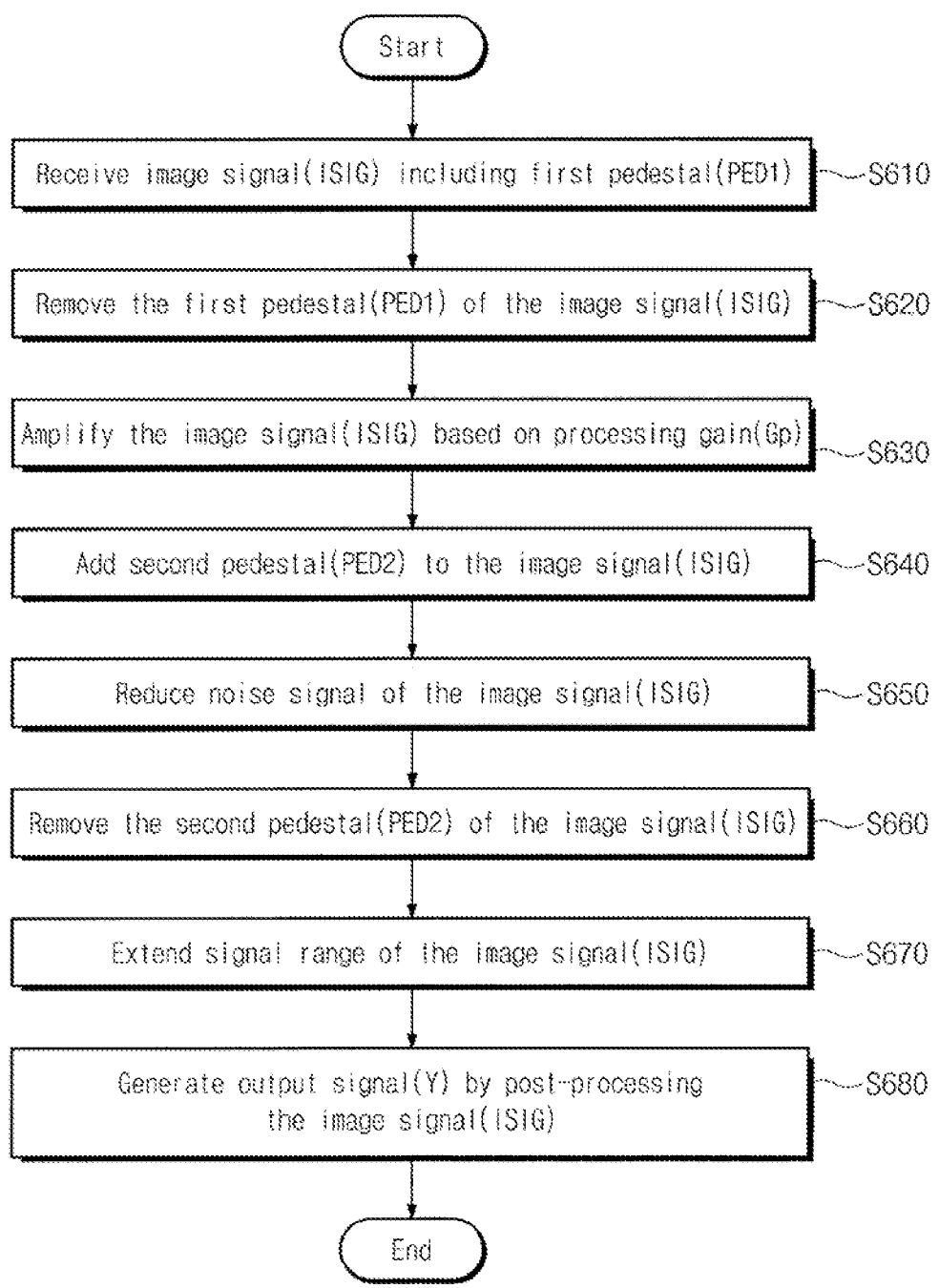
FIG. 10 illustrates a flowchart of an operation of an image signal processor of FIG. 8.

FIG. 10 is a flowchart illustrating an operation of the image signal processor 600 of FIG. 8. Referring to FIGS. 8 and 10, in operation S610, the image signal processor 600 may receive the image signal ISIG to which the first pedestal PED1 is added. In operation S620, the image signal processor 600 may remove the first pedestal PED1 from the image signal ISIG. In operation S630, the image signal processor 600 may amplify the image signal ISIG, from which the first pedestal PED1 is removed, based on the processing gain Gp.

In operation S640, the image signal processor 600 may add the second pedestal PED2 to the amplified image signal ISIG. The level L2 of the second pedestal PED2 may be greater than the level L1 of the first pedestal PED1. In operation S650, the image signal processor 600 may remove a noise signal of the image signal ISIG to which the second pedestal PED2 is added. In operation S660, the image signal processor 600 may remove the second pedestal PED2 of the image signal ISIG from which the noise signal is removed. In operation S670, the image signal processor 600 may extend a signal range of the image signal ISIG from which the second pedestal PED2 is removed. In operation S680, the image signal processor 600 may generate the output signal "Y" by post-processing the image signal ISIG, the signal range of which is extended.

Figure 11:
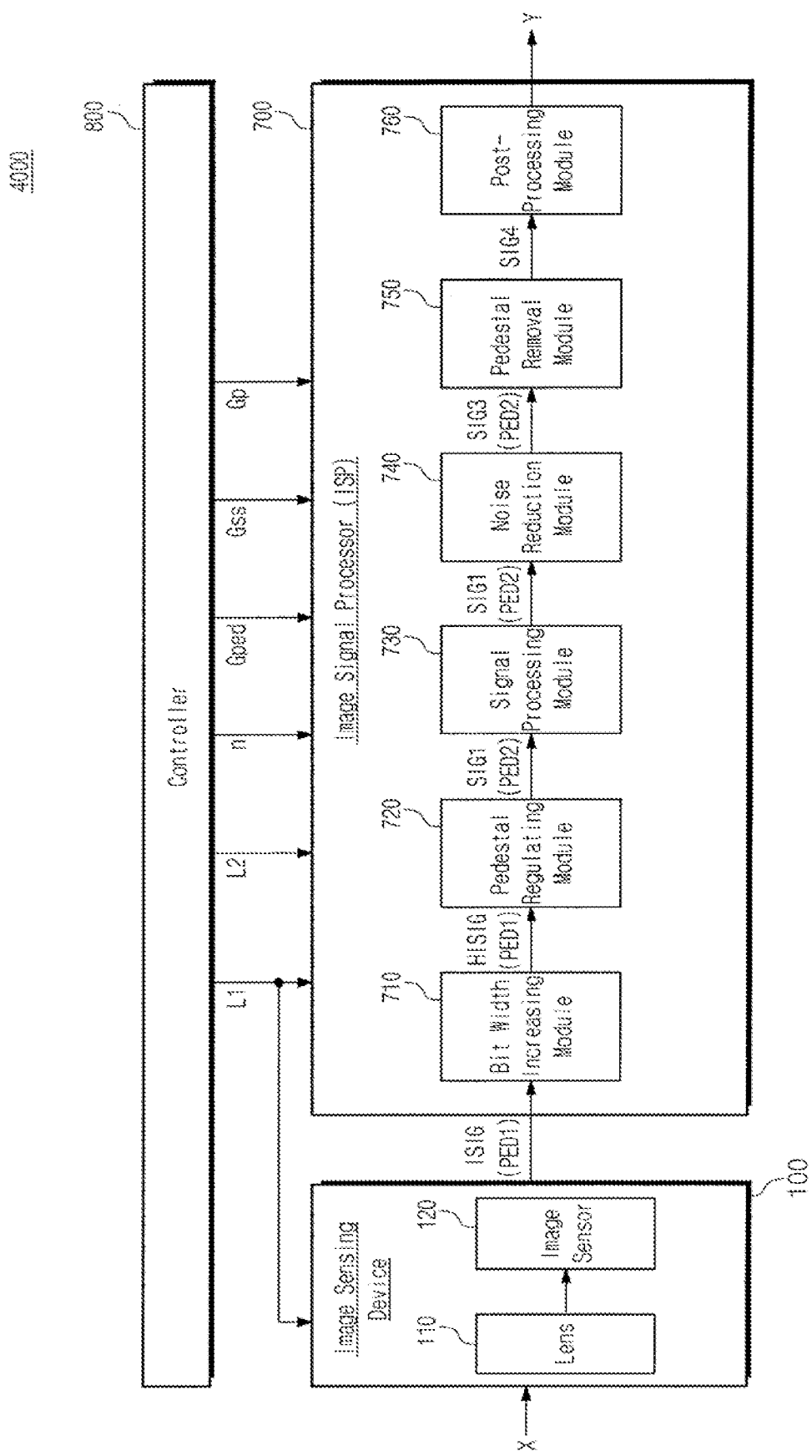
FIG. 11 illustrates a block diagram of an example of an electronic device according to an embodiment.

FIG. 11 is a block diagram illustrating an example of an electronic device. Referring to FIG. 11, an electronic device 4000 may include the image sensing device 100, an image signal processor 700, and a controller 800. The image signal processor 700 may include a bit width increasing module 710, a pedestal regulating module 720, a signal processing module 730, a noise reduction module 740, a pedestal removal module 750, and a post-processing module 760. An operation of the image sensing device 100 of FIG. 11 may be substantially identical to the operation of the image sensing device 100 of FIG. 1. Operations of the pedestal regulating module 720, the signal processing module 730, the noise reduction module 740, the pedestal removal module 750, and the post-processing module 760 may be similar to the operations of the pedestal regulating module 210, the signal processing module 220, the noise reduction module 230, the pedestal removal module 240, and the post-processing module 250 of FIG. 1. Below, a difference between the electronic device 1000 of FIG. 1 and the electronic device 4000 of FIG. 11 will be described.

Referring to FIG. 11, the bit width increasing module 710 may receive the image signal ISIG from the image sensor 120. For example, the image signal ISIG may be a signal of "m" bits which are less in number than "n" bits. The bit width increasing module 710 may increase a bit width of the image signal ISIG. For example, the bit width increasing module 710 may extend the image signal ISIG from "m" bits to "n" bits. The bit width increasing module 710 may generate an image signal HISIG by increasing the bit width of the image signal ISIG. That is, the bit width increasing module 710 may increase a dynamic range of the image signal ISIG. For example, the bit width increasing module 710 may include a high dynamic range (HDR) function.

The pedestal regulating module 720 may generate the first signal SIG1 by regulating a pedestal level of the image signal HISIG, the bit width of which is extended. Likewise, the signal processing module 730, the noise reduction module 740, the pedestal removal module 750, and the post-processing module 760 may process bitwidth-extended signals and may generate bitwidth-extended signals.

When a pedestal level is regulated at the image sensor 120, a dynamic range of the image signal ISIG input to the image signal processor 200 may be reduced. In this case, the bit width increasing module 710 may receive the image signal ISIG having the reduced dynamic range. The bit width increasing module 710 may extend a dynamic range of the image signal ISIG having the reduced dynamic range. As such, a dynamic range extension rate of the bit width increasing module 710 may become relatively great. That is, the performance of the bit width increasing module 710 may become relatively low.

In contrast, as illustrated in FIG. 11, when a pedestal level is regulated by the pedestal regulating module 720 after a dynamic range is extended by the bit width increasing module 710, the bit width increasing module 710 may receive the image signal ISIG, the dynamic range of which is not reduced. The bit width increasing module 710 may extend a dynamic range of the image signal ISIG, which is not reduced. As such, a dynamic range extension rate of the bit width increasing module 710 may be smaller than in the case where a pedestal level is regulated at the image sensor 120. That is, the performance of the bit width increasing module 710 may be relatively improved.

As described above, the electronic device 4000 may increase a range of brightness of the output signal "Y" by extending a dynamic range of the image signal ISIG. Also, the electronic device 4000 may minimize occurrence of image artifact by preventing clipping of the image signal ISIG through regulation of a pedestal level.

Figure 12:
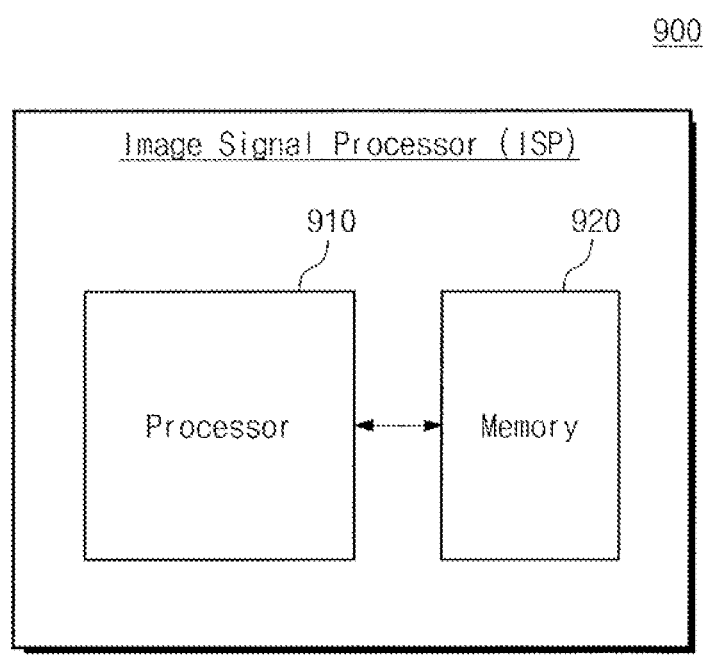
FIG. 12 illustrates a block diagram of an image signal processor according to embodiments.

FIG. 12 is a block diagram illustrating an image signal processor according to embodiments. Referring to FIG. 12, an image signal processor 900 may include a processor 910 and a memory 920. The memory 920 may store instructions, and the processor 910 may execute the instructions stored in the memory 920. The processor 910 may perform various operations of an image signal processor described with reference to FIGS. 1 to 11 based on the instructions. For example, the memory 920 may be a non-transitory computer-readable medium to be read by the processor 910.

Figure 13:
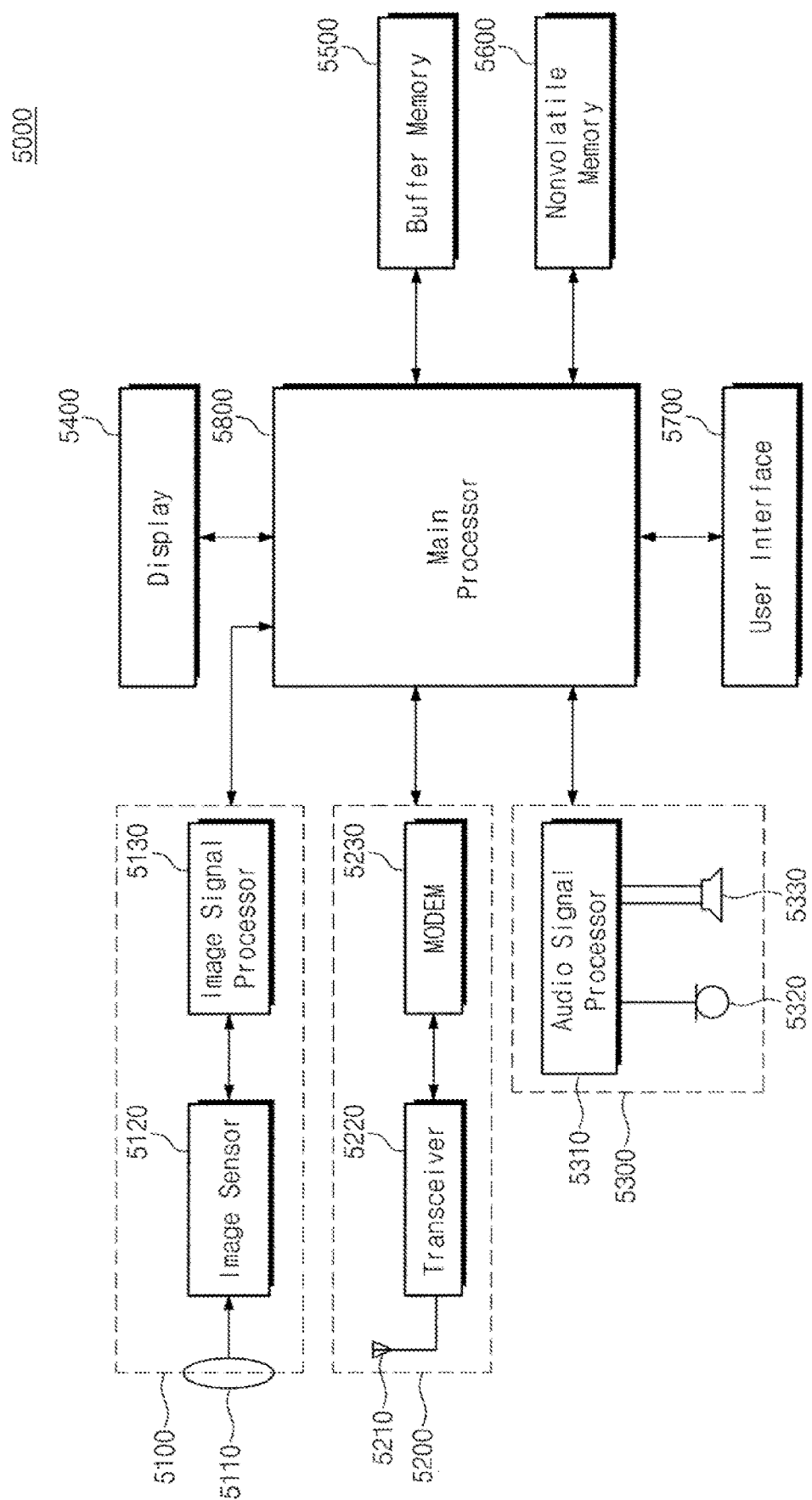
FIG. 13 illustrates a block diagram of an example of an electronic device incorporating an image signal processor to an embodiment.

FIG. 13 is a block diagram illustrating an example of electronic device incorporating an image signal processor according an embodiment. Referring to FIG. 13, an electronic device 5000 may include an image processing block 5100, a communication block 5200, an audio processing block 5300, a display device 5400, a buffer memory 5500, a nonvolatile memory 5600, a user interface 5700, and a main processor 5800.

The image processing block 5100 may receive a light signal through a lens 5110. An image sensor 5120 and an image signal processor 5130 included in the image processing block 5100 may generate image data associated with an external object, based on the received light signal. For example, the image sensor 5120 and the image signal processor 5130 may include functions of an image sensor and an image signal processor described with reference to FIGS. 1 to 12.

The communication block 5200 may exchange signals with an external device/system through an antenna 5210. A transceiver 5220 and a MODEM (Modulator/Demodulator) 5230 of the communication block 5200 may process signals, which are exchanged with the external device/system, in compliance with one or more of various wired/wireless communication protocols.

The audio processing block 5300 may process sound information by using an audio signal processor 5310, thus playing and outputting audio. The audio processing block 5300 may receive an audio input through a microphone 5320. The audio processing block 5300 may play the audio through a speaker 5330.

The display device 5400 may receive data from an external device (e.g., the main processor 5800) and may display an image through a display panel based on the receive data.

The buffer memory 5500 may store data used in an operation of the electronic device 5000. In an embodiment, the buffer memory 5500 may temporarily store data processed or to be processed by the main processor 5800. In an embodiment, the buffer memory 5500 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 5600 may store data regardless of power supply. In an embodiment, the nonvolatile memory 5600 may include at least one of various nonvolatile memories such as a flash memory, a PRAM, an MRAM, a ReRAM, and a FRAM. In an embodiment, the nonvolatile memory 5600 may include a removable memory such as a secure digital (SD) card, and/or an embedded memory such as an embedded multimedia card (eMMC).

The user interface 5700 may arbitrate communication between a user and the electronic device 5000. In an embodiment, the user interface 5700 may include input interfaces such as a keypad, a button, a touch screen, a touch pad, a gyroscope sensor, a vibration sensor, and an acceleration sensor. In an embodiment, the user interface 5700 may include output interfaces such as a motor and a LED lamp.

The main processor 5800 may control overall operations of the components of the electronic device 5000. The main processor 5800 may process various operations for the purpose of operating the electronic device 5000. For example, the main processor 5800 may be implemented with an operation processing device/circuit, which includes one or more processor cores, such as a general-purpose processor, a special-purpose processor, an application processor, or a microprocessor. For example, the main processor 5800 may function as a controller described with reference to FIGS. 1 to 12.

Figure 14:
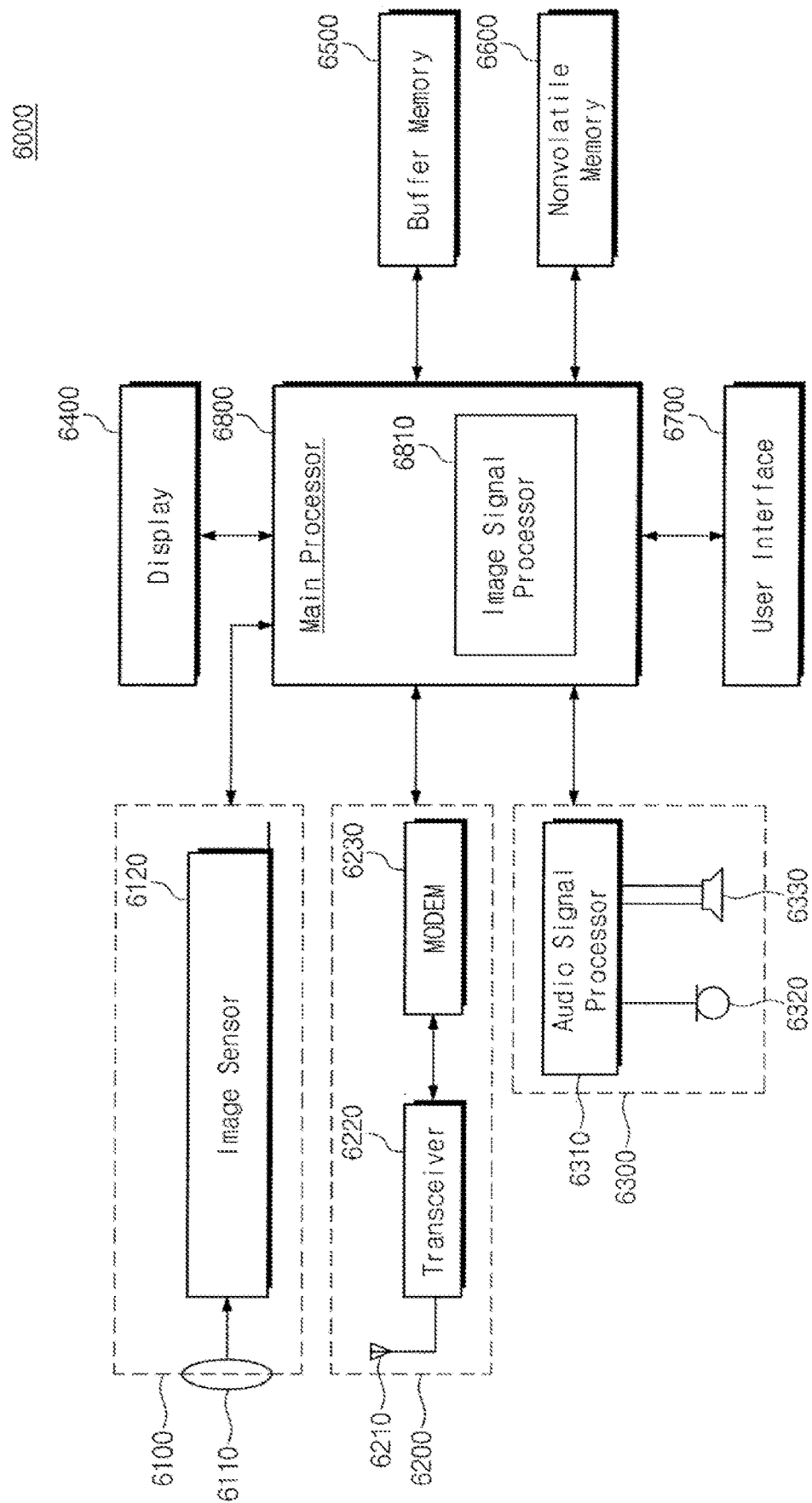
FIG. 14 illustrates a block diagram of an example of an electronic device incorporating an image signal processor to an embodiment.

FIG. 14 is a block diagram illustrating another example of an electronic device incorporating an image signal processor according to an embodiment. Referring to FIG. 14, an electronic device 6000 may include an image sensing block 6100, a communication block 6200, an audio processing block 6300, a display device 6400, a buffer memory 6500, a nonvolatile memory 6600, a user interface 6700, and a main processor 6800. Operations of the components of FIG. 14 are similar to the operations of the components of FIG. 13, and thus, additional description will be omitted to avoid redundancy.

The image sensing block 6100 may include a lens 6110 and an image sensor 6120. The image sensing block 6100 may provide image data generated from the image sensor 6120 to the main processor 6800. In an embodiment, the image sensor 6120 may include a function of an image sensor described with reference to FIGS. 1 to 12.

The communication block 6200 may exchange signals with an external device/system through an antenna 6210. A transceiver 6220 and a MODEM (Modulator/Demodulator) 6230 of the communication block 6200 may process signals, which are exchanged with the external device/system, in compliance with one or more of various wired/wireless communication protocols.

The audio processing block 6300 may process sound information by using an audio signal processor 6310, thus playing and outputting audio. The audio processing block 6300 may receive an audio input through a microphone 6320. The audio processing block 6300 may output the played audio through a speaker 6330.

The main processor 6800 may include an image signal processor 6810. For example, the main processor 6800 may include a function of a controller described with reference to FIGS. 1 to 12. The image signal processor 6810 may process image data provided from the image sensing block 6100. In an embodiment, the image signal processor 6810 may include a function of an image signal processor described with reference to FIGS. 1 to 12. Data processed from the image signal processor 6810 may be displayed as an image through the display device 6400.

According to one or more embodiments, an image signal processor may minimize occurrence of image artifact by regulating a pedestal level such that an image signal is not clipped. Embodiments provide an image signal processor and an electronic device which regulates a pedestal level dynamically such that a noise signal is not clipped in signal processing. Also, the image signal processor may regulate a pedestal level within a limited processing bit width.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image signal processor that generates a display signal, the image signal processor:
   receiving an input image signal having a first pedestal level from an image sensor;
   extending the input image signal from m bits to n bits; and
   generating a first signal from the input image signal, the first signal including a second pedestal level, the second pedestal level being different from the first pedestal level and being determined in accordance with the first pedestal level and a processing gain of the image signal processor.

2. The image signal processor as claimed in claim 1, wherein the processing gain is determined based on at least one of a gain for lens shading correction and a gain for white balance correction.

3. The image signal processor as claimed in claim 1, wherein the image signal processor expands a bit width of the input image signal up to a processing bit width of the image signal processor before generating the first signal.

4. The image signal processor as claimed in claim 1, wherein the image signal processor generates the first signal by:
   generating a first pedestal removal signal by subtracting the first pedestal level from the input image signal;
   generating a range reduction signal in accordance with the first pedestal removal signal and a pedestal gain, the pedestal gain being less than 1; and
   adding the second pedestal level to the range reduction signal.

5. The image signal processor as claimed in claim 1, wherein the image signal processor:
   generates a second signal having the second pedestal level by amplifying the first signal in accordance with the processing gain;
   generates a third signal having the second pedestal level by removing a noise signal from the second signal; and
   generates a fourth signal by subtracting the second pedestal level from the third signal.

6. The image signal processor as claimed in claim 5, wherein the image signal processor extends the fourth signal in accordance with a signal stretching gain calculated based on the second pedestal level and a processing bit width of the image signal processor.

7. The image signal processor as claimed in claim 6, wherein the image signal processor generates the second signal by:
   generating a second pedestal removal signal by subtracting the second pedestal level from the first signal;
   amplifying the second pedestal removal signal in accordance with the processing gain; and
   adding the second pedestal level to the amplified second pedestal removal signal.

8. An electronic device, comprising:
   an image sensor to generate an image signal having a first pedestal level added thereto;
   an image signal processor that extends the image signal from m bits to n bits and generates a display signal from the image signal; and
   a controller to control operations of the image sensor and the image signal processor,
   wherein the image signal processor generates, based on the image signal, a first signal having a second pedestal level, different from the first pedestal level, added thereto, the second pedestal level being determined in accordance with the first pedestal level and a processing gain of the image signal processor.

9. The electronic device as claimed in claim 8, wherein the processing gain is determined based on at least one of a gain for lens shading correction and a gain for white balance correction.

10. The electronic device as claimed in claim 8, wherein the image signal processor:
    generates a first pedestal removal signal by subtracting the first pedestal level from the image signal;
    generates a range reduction signal in accordance with the first pedestal removal signal and a pedestal gain, the pedestal gain being less than 1; and
    generates the first signal by adding the second pedestal level to the range reduction signal.

11. The electronic device as claimed in claim 10, wherein the image signal processor generates a second signal by amplifying the first signal based on the processing gain,
    wherein the image signal processor generates a third signal by removing a noise signal from the second signal, wherein a magnitude of the noise signal is less than the second pedestal level, and
    wherein the image signal processor generates a fourth signal by subtracting the second pedestal level from the third signal.

* * * * *